INVENTOR
J. C. STEINBERG
BY
Walter E. Kiesel
ATTORNEY

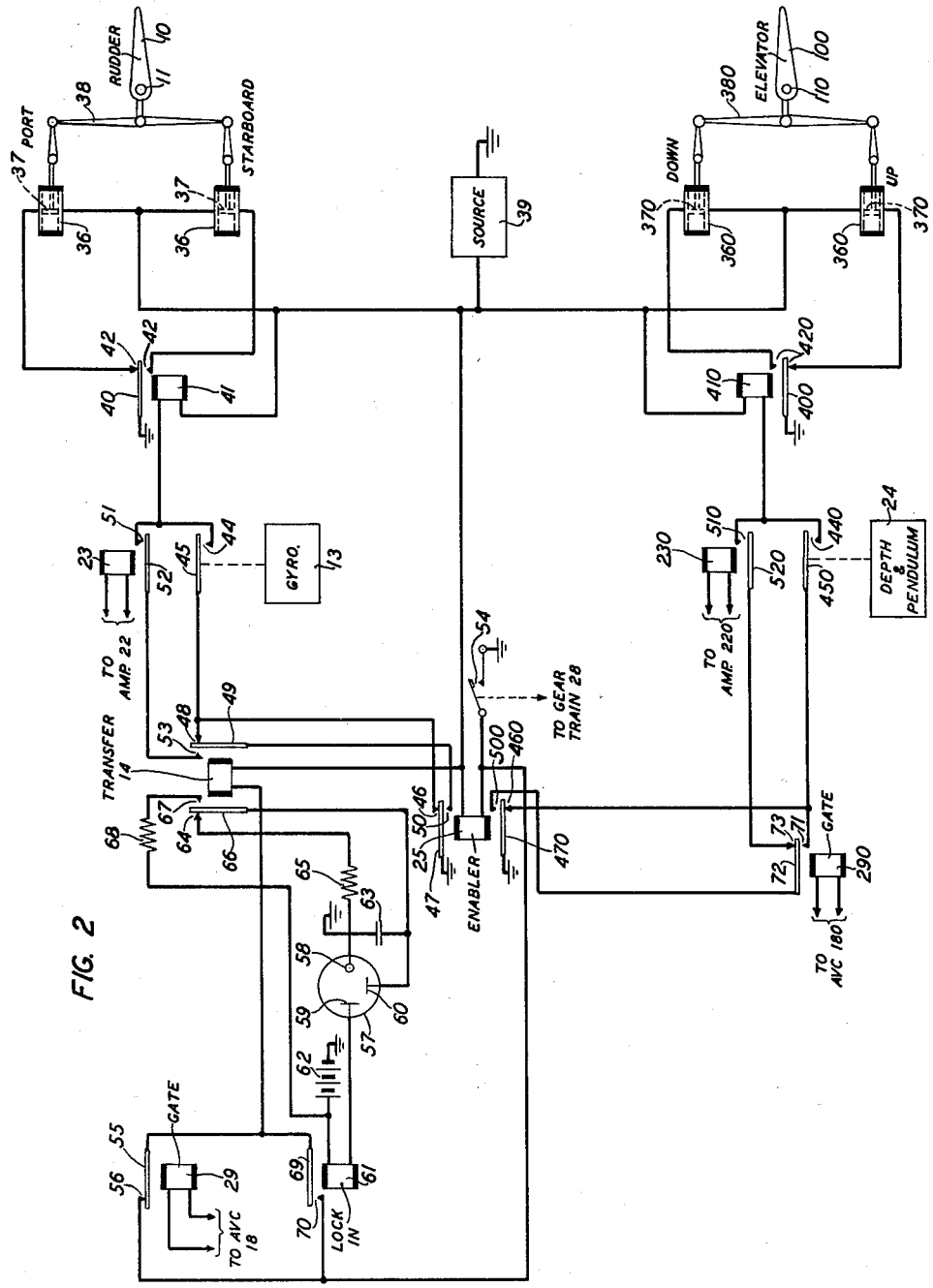

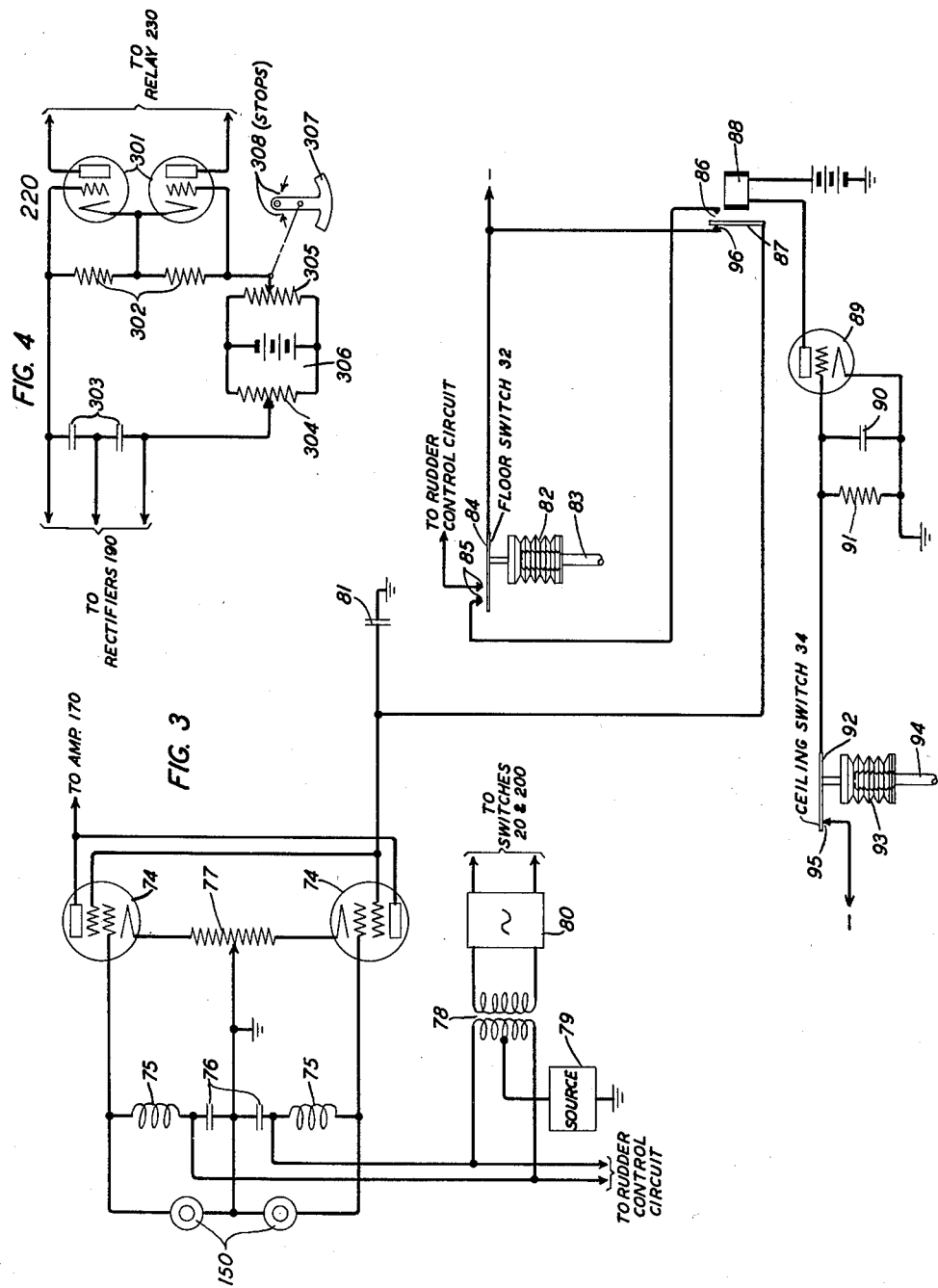

2,991,742
Patented July 11, 1961

2,991,742
TORPEDO CONTROL CIRCUIT
John C. Steinberg, Short Hills, N.J., assignor to Bell Telephone Laboratories, Incorporated, New York, N.Y., a corporation of New York
Filed Sept. 23, 1944, Ser. No. 555,523
16 Claims. (Cl. 114—23)

This invention relates to control circuits and more particularly to torpedo steering systems of the type wherein the rudder or elevator, or both, is controlled for at least a portion of the run of the torpedo toward a target, such as a ship, in accordance with signals, such as ship and propeller noises, emanating from the target, to guide the torpedo toward the target.

In a more specific aspect, this invention relates to such systems wherein, for the first portion of the torpedo run, the rudder is controlled by a gyroscope to maintain the device upon a preset course and the elevator is controlled by a depth or depth and pendulum unit to maintain the device at a preassigned running depth, and wherein, for the latter portion of the run, the rudder and elevator are controlled in accordance with signals emanating from the target.

In such a system, the control of the rudder and elevator in accordance with target signals may be effected by a pair of submarine signal responsive circuits, one for the rudder and one for the elevator, such as disclosed, for example, on the application of Donald D. Robertson, Serial No. 491,795, filed June 22, 1943, and the transfer of the rudder from gyroscope, and of the elevator from depth, to target signal control may be effected by gate elements responsive only when the signal intensity at the input elements of the circuits is of at least a preassigned amplitude. The input elements for each circuit may be a pair of hydrophones mounted on opposite sides of the longitudinal axis of the torpedo, that is, one pair mounted on the top and bottom of the torpedo and serving as the input elements for the elevator control circuit and the other pair being mounted upon the port and starboard sides of the torpedo and serving as input elements for the rudder control circuit. Because of the shadow effect of the torpedo, the relative outputs of the hydrophones of each pair are a function of the direction of the target with respect to the torpedo. As described in detail in the application above-identified, the outputs of each pair of hydrophones are resolved into a target difference signal related in amplitude and polarity to the bearing and direction with respect to the axis noted, of the target and the rudder and elevator are deflected in accordance with the respective difference signal.

As indicated above, the point in the run at which transfer from gyroscope and depth control to target signal control occurs may be determined by gate elements controlled in accordance with the signal level at the hydrophones. The level requisite for operation of the gate elements associated with the rudder and elevator circuits may be the same for the two although advantageously that requisite for operation of the elevator gate element may be somewhat higher than that for the rudder gate element, whereby the torpedo may remain at a substantial depth, which is conducive to a high signal to torpedo self-noise ratio and, hence, to a high signal control range as pointed out in the application of Alton C. Dickieson, Serial No. 545,835, filed July 20, 1944, before it is transferred to control in the vertical direction by target signals. In any event, it is advantageous that once the torpedo comes within a prescribed range of the target, the rudder be connected permanently to control in accordance with target signals. For reasons which will appear presently, it is advantageous also that the elevator be not committed permanently to signal control once transfer to such control is effected.

To provide for permanent commitment of the rudder to signal control, means may be associated with the transfer mechanism in the rudder system for locking in the mechanism when the gate element in this system operates. However, there is present the possibility that while the torpedo is traveling under gyroscope and depth control, the hydrophones may receive signals, due to, for example, mines, depth charges or gun fire, of transient character and of sufficient intensity to result in operation of the gate elements. Such false operation of these elements, as will be apparent, would result in false steering of the torpedo so that it would be guided or set upon an incorrect course and, consequently, might never reach a position at which it was within the effective signal field of the target, that is, a position such that the target signals were of sufficient intensity to effect control of the rudder and elevator in accordance therewith.

Also, even when the torpedo has been brought under control to be steered in accordance with target signals, there is present the possibility that it may miss the target. In an attack upon a surface vessel, the direction of the torpedo motion in the vicinity of the target is, generally, sharply upward so that in the event of a miss, the torpedo may broach. In such case, generally, the target considered as a signal source is astern and below the torpedo. Hence, the latter, if the rudder and elevator remained under signal control, would tend to turn both horizontally and vertically or conceivably in a vertical circle. Inherently, the minimum turning radius of the torpedo is fixed, is substantially the same in both horizontal and vertical directions, and for a torpedo of lengths commonly employed, is relatively large. Of course, the exact path followed by the device in maneuvering to reattack is dependent upon its position after it has missed and broached. In any case, however, it will be appreciated that if the rudder and elevator remain under signal control, and the torpedo turns both horizontally and vertically to orient itself for reattack, the path, generally spiral, will be relatively long and the device may pass outside of the effective signal field of the target. Also, the depth to which it might be steered in following such a path may be so great as to cause it to foul on the seat bottom.

In the event of a miss, the possibility exists also that the torpedo may be or become so oriented and the signal field thereadjacent may be such that the difference signal in the elevator circuit may be of the polarity to result in up-elevator, whereby the device would be steered upwardly and broach again. For example, the torpedo could be in such position, for example near the sea surface, that the signal intensity at the upper hydrophone, considering both target signals and reflections of these signals from the sea surface, is greater than that at the lower hydrophone. Hence, the difference signal in the elevator circuit would be of the polarity to produce up-elevator and the torpedo would be steered upwardly away from the target. Also, in turning to reattack and particularly when its stern is toward the target, it may become so oriented that the elevator control circuit produces an up-elevator difference signal and the torpedo is caused to tilt upwardly in such manner that the lower hydrophone would be shielded from the target. As a result, the torpedo would travel upwardly and might again broach.

One general object of this invention is to improve the performance of torpedoes having target signal responsive steering systems. More specifically, objects of this invention are to:

Prevent false operation, in torpedo steering systems of the type described hereinabove, of the mechanism for effecting transfer of the rudder from gyroscope to target signal control;

Decrease the reattack time of a signal guided torpedo in the event of a miss of the target;

Assure orientation of such a torpedo, in the event of a miss, in such manner that it will be brought to a position to reattack;

Obtain self-maneuvering of such torpedo, in the event of a miss, in a manner that it will reach a position conducive to high signal control range;

Prevent false operation of a signal responsive elevator control system in a signal guided torpedo;

Minimize the possibilities of such a torpedo broaching while maneuvering to reattack; and Reduce the possibility of such a torpedo running out of the effective signal field of a target in the event of a miss and while it is maneuvering to reattack.

In accordance with one feature of this invention, means are provided in the rudder control system for preventing commitment of the rudder to signal control in response to transient signals, such as explosion noises. More particularly, in accordance with one feature of this invention, means are provided in the rudder control system for preventing locking-in of the transfer element unless the signal level at the input elements of the system persists for a preassigned period sufficiently long to be greater than the duration of explosion and similar pulses.

In accordance with another feature of this invention, means are provided for disabling the signal control circuit for the elevator for a period of preassigned duration whenever the torpedo rises above a prescribed depth, the duration being such as to allow the torpedo to sink to a substantial depth before the circuit mentioned is again enabled.

In accordance with a further feature of this invention, means are provided for limiting the climb angle, or both climb and dive angles, of a torpedo under signal control for a limited range of elevator difference signals whereby, particularly in the event of a miss, the vertical motion of the torpedo is limited until it is so oriented relative to the target that accurate control of the elevator in accordance with target signals may be realized.

The invention and the above-noted and other features thereof will be understood more clearly and fully from the following detailed description with reference to the accompanying drawing, in which:

FIG. 2 is a circuit diagram showing details of an illustrative steering system of the configuration shown in FIG. 1, particularly details of the transfer elements and the controls therefor;

FIG. 3 is a circuit diagram illustrating other details of such a steering system, particularly of the disabling means for the elevator signal control circuit; and FIG. 4 is another circuit diagram showing further details of such a system, particularly of the climb angle limiting means associated with the elevator signal control circuit.

Figure 1:
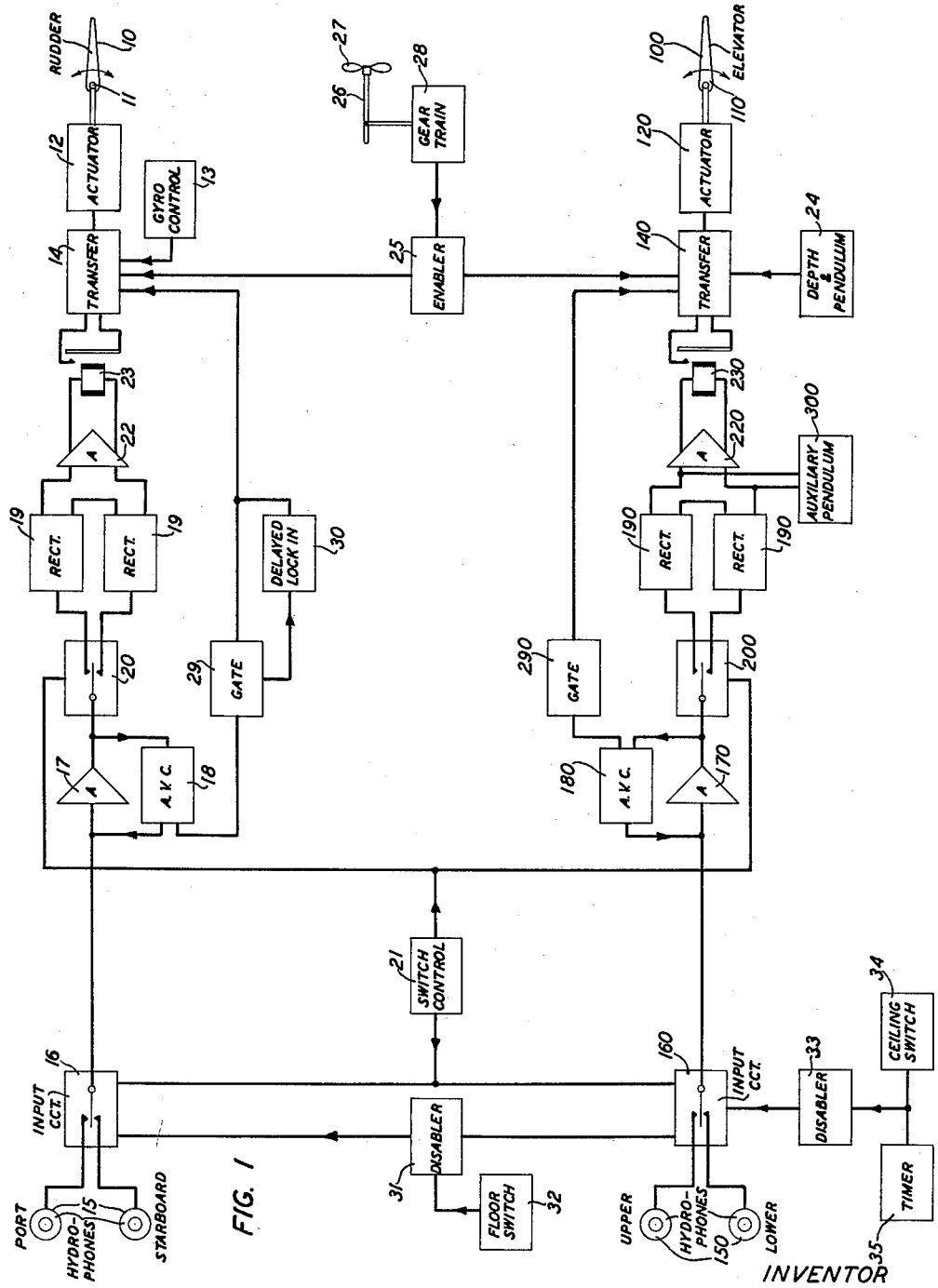
FIG. 1 is a diagram, mainly in functional block form, of a torpedo steering system illustrative of one embodiment of this invention.

Referring now to the drawing and particularly to FIG. 1 thereof, the torpedo steering system illustrated comprises a rudder 10 for steering the torpedo horizontally and an elevator 100 for steering it vertically. The rudder 10 is deflectable in opposite directions about a pivot 11 by an actuator 12 which is adapted to be controlled by either a gyroscope element 13 or a submarine signal responsive system both of which are arranged to be associated with the actuator 12 by way of a transfer element 14. Normally, the gyroscope element is associated with the actuator 12 for the rudder 10 and the signal responsive system is dissociated therefrom.

The gyroscope element 13 is of generally known construction and, therefore, need not be described in detail. Suffice it to say that it operates to control the actuator in accordance with the departure of the torpedo from a preset course whereby the rudder is deflected accordingly to bring the torpedo on course.

The signal responsive system may be of the general construction disclosed in the application Serial No. 491,795, filed June 22, 1943 of Donald D. Robertson, and comprises a pair of hydrophones 15 mounted symmetrically on opposite sides of the longitudinal axis of the torpedo and connected to an input circuit 16 which, as indicated in FIG. 1, includes a switch operable to connect the two hydrophones in alternation to an amplifier 17 provided with automatic gain control 18. The gain control 18 is of the type which impresses upon the input side of the amplifier a voltage determined by the output level of the amplifier in such manner as to proportionately decrease the amplifier gain as the output level increases.

The output of the amplifier 17 is supplied in alternation to a pair of rectifiers 19 by way of a switch 20 which is operated in synchronism with the switch in the input circuit 16 by a switch control 21. Thus, each of the hydrophones 15 is connected periodically to the respective rectifier 19 so that the output of each rectifier is proportional to the output of the respective hydrophone. Viewed in another way, the signal responsive system comprises two substantially identical channels, enabled in alternation, each channel comprising one of the hydrophones 15, the respective rectifier 19 and the amplifier 17.

The rectifier outputs are combined in difference relation to produce a control signal related in amplitude and polarity to the relative outputs of the two hydrophones and, thus, to the angle and direction with respect to the torpedo, of the source of the signals received by the hydrophones. The control signal is impressed upon the input circuit of a direct current amplifier 22, which may be biased at cut-off and has a relay 23 included in the output circuit thereof. The relay 23 is associated with the transfer element 14 and thence with the actuator 12 in such manner, described in detail hereinafter, that when the control signal applied to the amplifier 22 is of one polarity, the actuator 12 deflects the rudder in one direction and when this signal is of the opposite polarity, the rudder is deflected in the other direction. In both cases, the direction of rudder deflection is such as to steer the torpedo to bring it on course toward the source of the signals received by the hydrophones 15.

The elevator control system is similar to that for the rudder and in the drawing the elements of the former corresponding to those of the latter are designated by the same reference numeral multiplied by ten as the respective element of the rudder control system. The elevator system comprises, instead of a gyroscope control, a depth and pendulum unit 24 of generally known construction which, when associated with the actuator 120 controls the elevator 100 to maintain the torpedo level and at a preassigned depth, for example 80 feet.

The transfer elements 14 and 140 have associated therewith an enabler 25 which may be actuated from the shaft 26 for the propeller 27 as by way of a gear train 28. As will be pointed out in detail hereinafter, the enabler 25 functions to condition the rudder and elevator control circuits for transfer of the rudder and elevator to signal control from gyroscope and depth and pendulum control respectively at the end of a preassigned period after launching of the torpedo, this period being of sufficient duration to allow the torpedo to travel beyond the effective signal field of the launching vessel before it can be committed to signal control.

The transfer of the rudder from gyroscope control to signal control, assuming that the enabler 25 has operated, is effected by operation of a gate 29, which is energized in accordance with the voltage of the automatic gain control 18 and is set to operate only when the voltage is of at least a preassigned amplitude. As will be apparent, this voltage is related to the signal level at the hydrophones 15 so that the gate 29 will operate only when this level is of at least a preassigned amplitude. Associated with the gate 29 is a delayed acting lock-in 30 designed to operate only if the preassigned or greater signal level obtains continuously for a fixed time, e.g. of the order of 5 seconds, and which, when it operates, commits the rudder permanently to signal control. Because of its delayed action character, the lock-in 30 prevents false commission of the rudder to signal control by transient signal pulses of short duration, e.g. pulses due to mines or to shell fire. Consequently, the rudder can be placed under signal control permanently only when the torpedo is within a steady sound field exceeding a preassigned level.

The elevator control circuit includes a similar gate 290 controlled in accordance with the voltage of the automatic gain control 180 so that the elevator 100 is transferred to signal control from control by the depth and pendulum unit 24 only when the torpedo is within the preassigned range of the target. As noted heretofore, advantageously this range is less than that requisite for operation of the gate 29. For reasons which will be seen from the description hereinafter, no lock-in is provided in the elevator control circuit.

Associated with both the input circuits 16 and 160 is a disabler 31 controlled by a floor switch 32, which operates whenever the torpedo sinks to below a prescribed depth, for example 100 feet, to disable the signal controls for both the rudder and the elevator.

The general operation of the system as thus far described is as follows: When the torpedo is launched, the elevator 100 is under control of the depth and pendulum unit 24 and the rudder is under control of the gyroscope element 13 so that the torpedo proceeds on the course for which the gyroscope is set and is steered vertically to and at the running depth for which the depth and pendulum unit is set. At the end of a prescribed period after launching sufficient, as noted heretofore, to allow the torpedo to pass beyond the effective signal field of the launching vessel or submarine, the enabler 25 operates to condition the rudder and elevator system for transfer to signal control. At this time, one of several conditions may be present. The torpedo may be at such position that no signals or signals of a level below that requisite to cause operation of the gates 29 and 290, are received by the hydrophones 15 and 150. In this case, the torpedo continues running under gyroscope and depth and pendulum control. On the other hand, at this time the torpedo may have entered the target signal field sufficiently to result in operation of the gates 29 and 290. In this case, the elevator and rudder are transferred to signal control and, if the requisite signal level at the hydrophones obtains continuously for the preassigned time, the lock-in 30 operates to commit the rudder thenceforth to signal control.

If, after the enabler 25 has operated and the torpedo is traveling under gyroscope and depth and pendulum control, signals of short duration, for example explosion signals due to mines, of sufficient intensity are received by the hydrophones, the gates 29 and 290 operate and the rudder and elevator are transferred temporarily to signal control. Upon the cessation of such short signals, the rudder and elevator are returned to gyroscope and depth and pendulum control respectively and the delayed lock-in is reset to zero time assuming, of course, that the duration of such signals is insufficient to effect operation of the lock-in 30.

After operation of the gates 29 and 290 and of the lock-in 30, the torpedo is guided to the target in accordance with signals emanating from the target. If, while so guided, the torpedo sinks below the depth set by the floor switch 32, the latter operates to disable both the elevator and rudder signal control circuits and the elevator is returned to control by the depth and pendulum unit 24, whereby the torpedo is steered upwardly to a point above this depth, whereupon the rudder and the elevator are returned to signal control.

The rudder and elevator, controlled in accordance with the target signals, guide the torpedo to the target, the vertical component of the path followed being upward, as is apparent. The possibility exists that the torpedo may miss the target and, inasmuch as it has an upward component of velocity, broach beyond the target so that its stern is toward the target. In such event, as is obvious, it is necessary for the torpedo to turn about in order to reattack. Inherently, the minimum turning radius is fixed and generally is substantially the same in both the horizontal and vertical directions. It will be appreciated, therefore, that if, after a miss, the rudder and elevator remain under signal control, the torpedo might be steered along a vertical circle or along a spiral of a pitch and radius dependent upon, among other factors, the minimum turning radius of the torpedo. Under the conditions postulated, there is a possibility that on turning to reattack, the torpedo might pass beyond the effective signal field of the target and, hence, never reattack. Also if the attack is in waters where the depth is less than twice the minimum turning radius of the torpedo, the latter in turning after a miss may strike the sea bottom and be disabled.

Moreover, if the torpedo misses the target, it may be in such position, and the submarine signals in its vicinity may be such, that false steering in the vertical direction would result. For example, after broaching the torpedo may be so oriented that due to reflections at the sea surface of the target signals, the signals received by the upper hydrophone in the elevator control system are greater than those received by the lower hydrophone. Consequently, up-elevator would result and the torpedo might broach again.

In accordance with one feature of this invention, means are provided for effecting control of the torpedo in such manner, in the event of a miss, that the time requisite for the torpedo to be reoriented for attack is reduced and false operation of the elevator in the manner above indicated is prevented. Specifically, means are provided for disabling the signal control for the elevator for a period of preassigned duration in the event of a miss, transferring the elevator to depth and pendulum control for this period and returning it to signal control at the end of this period. Thus, in the event of a miss, the torpedo tends to sink to its normal running depth, under depth and pendulum control while the rudder remains under signal control and turns the torpedo horizontally at its minimum turning radius.

In one specific form, the means aforenoted comprise a disabler 33 for disabling the input circuit 160, controlled by a ceiling switch 34 and a timer 35. The ceiling switch 34 is set to operate whenever the torpedo rises above a preassigned depth, for example 6 feet, whereupon the disabler is operated, and the timer 35 serves to maintain the disabler operated for the preassigned period after operation of the ceiling switch.

The duration of the disable period may be set at various values with consideration for a number of factors, such as the minimum turning radius of the torpedo, its speed, the probable level of the target signals and the like. For example, this period may be made such that it is sufficient for the torpedo to sink, under depth and pendulum control to its normal running depth or it may be made such as to allow the torpedo to be turned by signal control of the rudder through an angle of the order of 180 degrees. In any case, it is advantageous that the period be of sufficient duration to allow the torpedo to sink to a substantial depth, for the reason that at greater depths the level of torpedo self-noise decreases. Thus, as the torpedo sinks, the target signal to self-noise ratio increases and if the elevator is returned to signal control at a substantial torpedo depth, a high range for elevator control in accordance with target signals is realized.

If the duration of the period discussed above is made such as to allow turning of the torpedo horizontally through an angle of less than 180 degrees or greater before the elevator is returned to signal control, the possibility exists that broaching may occur. This will be appreciated from the following considerations. When the elevator is returned to signal control at the end of the period noted, the torpedo may be below the target and oriented so that it is directed away from the target. The signal intensity at the upper hydrophone, therefore, is greater than at the lower whereby up-elevator is produced, and the torpedo is tilted upwardly. Now, if the torpedo is directed away from the target, upon tilting upwardly it shields the lower hydrophone from the target and, as a result, up-elevator continues. Hence, the torpedo would tend to turn in a vertical circle so that while it is being guided with both rudder and elevator under signal control after a miss and after the end of the period aforenoted, it may not reach such position that the lower hydrophone will be exposed sufficiently to the target to effect true control of the elevator to steer the device vertically toward the target, Thus, the torpedo may broach while it is turning to reattack.

In accordance with a feature of this invention, means are provided for preventing such broaching. More specifically, means are provided for limiting the angle of climb of the torpedo for a limited range of angles whereby for target signals, as applied to the elevator actuating system, below a preassigned amplitude, the angle of climb is maintained below a certain value and, therefore, the torpedo may rise to only a limited extent before it is turned horizontally to be pointed in the general direction of the target. Once the torpedo has been thus turned, the lower hydrophone will be exposed sufficiently to the target to produce control of the elevator in accordance with the difference in signal intensities at the upper and lower hydrophones, so that broaching in the manner decribed above is prevented.

In one form, the means noted comprises an auxiliary pendulum control 300 associated with the amplifier 220 and effective to introduce in the amplifier input circuit a bias proportional to angle of torpedo tilt for a limited range of angles of tilt and in opposing relation to the signal impressed upon the circuit due to the hydrophones 150. For example, the pendulum control may be so constructed as to produce a decibel bias per degree of upward tilt, or either upward or downward tilt, of the torpedo for angles of 8 degrees or less, and of such polarity as to oppose the signal supplied to the amplifier 220 due to the hydrophones. Thus, for target signals, specifically the target differential signals, of less than 8 decibels, the climb, or dive, angle is limited to 8 degrees.

When the torpedo maneuvers to reattack after a miss and the elevator is under signal control, the torpedo is at some distance from the target so that the angle between the target and torpedo is small. The elevator is deflected to steer the torpedo upwardly and, at the beginning of this action, the angle of climb will be limited to a maximum of 8 degrees by the auxiliary pendulum control. As the device approaches the target, the angle between the two increases so that the target differential signal also increases and becomes much greater than the bias due to the auxiliary pendulum control. Thus, the target signal overrides the bias and the torpedo completes its attack substantially under target signal control. Inasmuch as the bias which the auxiliary pendulum control can produce is limited, it will be appreciated that although this control serves to prevent broaching, it does not impair the accuracy of the attack or reattack. Also if the control is such as to be responsive to both downward and upward tilt, it serves to guard against sharp dives of the torpedo as well as broaching when the elevators are under the control of the target signal.

Details of a steering system illustrative of this invention are shown in FIGS. 2, 3 and 4. As shown in the former figure, the actuator for the rudder 10 comprises a pair of solenoids 36, the armatures 37 of which are coupled to the rudder by a suitable linkage 38, the direction of deflection of the rudder being determined by which of the solenoids 36 is energized. The energizing circuit for each of the solenoids includes the source 39, such as a battery, the grounded armature 40 of the control relay 41 and the respective contacts 42 of this relay. Advantageously, normally, that is when the relay 41 is deenergized, the armature 40 engages one of the contacts 42, as shown. As is apparent, the direction of deflection of the rudder 10 is determined by which of the contacts 42 is engaged by the armature 40.

The relay 41 is energized from the source 39 over one or the other of two circuits, one of which is controlled by the gyroscope element 13 and the other of which is controlled by the relay 23. The first circuit mentioned includes the contact 44 and armature 45 of a switch controlled by the gyroscope, and either the contact 46 and armature 47 of the enabler relay 25 or the contact 48 and armature 49 of the transfer relay 14 and the contact 50 and armature 47 of the enabler relay 25. As shown in FIG. 2, normally the contact 46 is engaged by the armature 47 and the contact 48 is engaged by the armature 49.

The second circuit mentioned is normally open and comprises the contact 51 and armature 52 of the relay 23, the armature 49 and contact 53 of the transfer relay 14 and the contact 50 and armature 47 of the enabler relay 25.

The enabler relay 25 is energized from the source 39 over an obvious circuit including the switch 54 which is actuated from the gear train 28 and closes when the propeller has made a prescribed number of revolutions sufficient to bring the torpedo beyond the effective signal field of the launching vessel as noted heretofore.

When the torpedo is launched, the rudder control circuit is in the condition shown in FIG. 2 and the rudder is under control of the gyroscope element 13. Specifically, the gyroscope operates to close or open the energizing circuit for the relay 41 at the point 44, 45 depending upon the direction of departure of the torpedo from the preset course so that the rudder is deflected accordingly to maintain the torpedo on this course. The energizing circuit for the relay 41 at this time is traced from ground through source 39 and relay 41, then over contact 44 and armature 45 to contact 46 and thence to ground over armature 47.

When the switch 54 closes, the enabler relay 25 operates to transfer the armature 47 from contact 46 to contact 50. If at this time, the signal level at the hydrophones is insufficient to effect operation of the gate 29, the rudder remains under control of the gyroscope. Specifically, the energizing circuit for the relay 41 now includes the contact 48 and armature 49 of the transfer relay 14 and the contact 50 and armature 47 of the enabler relay 25.

When the gate relay 29, which is normally operated, releases, the transfer relay 14 is energized from the source 39 over the circuit including the armature 55 and contact 56 of the gate relay and the switch 54. Operation of the transfer relay opens the gyroscope control circuit for the relay 41 at the contact 48 and places the relay 41 under control of the relay 23 through the circuit traced from the relay 41 over contact 51 and armature 52 of the relay 23, contact 53 and armature 49 of the transfer relay 14 and contact 50 and armature 47 of the enabler relay 25.

The lock-in 30 comprises a gaseous discharge device 57 of the trigger type having a cathode 58, an anode 59 and a control electrode 60, the cathode being grounded as shown and the anode circuit including the winding of the lock-in relay 61 and a source 62. The voltage of the source 62 is below the breakdown voltage of the anode-cathode gap but at least as high as the sustaining voltage for this gap, whereby normally the device 57 is non-conducting. The cathode 58 and control electrode 60 are bridged by a condenser 63, one terminal of which is connected to the contact 64 of the transfer relay through a suitable resistance 65 and the other terminal of which is connected to the armature 66 of this relay. The other contact 67 of this relay is connected to the source 62 over a suitable resistance 68. Normally, that is when the transfer relay 14 is not energized, the armature 66 thereof is in engagement with the contact 64. Also, when the device 57 is non-conducting, the armature 69 of the lock-in relay 61 is out of engagement with the associated contact 70.

When the transfer relay 14 operates, the armature 66 is moved into engagement with the contact 67 so that the condenser 63 is charged from the source 62 through the resistance 68. At the end of a period, determined by the capacitance of the condenser 63 and the magnitude of the resistance 68, the potential across the condenser will rise to the value requisite to break down the gap between the cathode 58 and control electrode 60, whereby the device 57 is rendered conducting and the relay 61 is operated. The time requisite for the condenser to charge to the voltage noted may be set at any desired value by correlation of the constants of the charging circuit. In one embodiment, a time of the order of 4 seconds has been found satisfactory. When the relay 61 operates, it closes permanently an energizing circuit for the transfer relay, traced from the source 39, through relay 14, over armature 69 and contact 70 of the relay 61 and thence to ground by way of the switch 54.

If the signal resulting in operation of the gate relay ceases or falls below the requisite value before the elapse of the period necessary to charge the condenser 63 to the required voltage, the gate relay 29 operates and consequently the transfer relay releases. Hence, the rudder is returned to gyroscope control and, also, the charging circuit for the condenser 63 is opened and the condenser discharges through the resistance 65. Advantageously, the resistance 65 is made such that the discharge rate for the condenser is greater than the charging rate to prevent operation of the device 57 by a series of short pulses.

The actuating system for the elevator 100 is substantially the same as that for the rudder, as is apparent from FIG. 2. The control relay 410 for this system is adapted to be controlled over one of two circuits, one of which includes the contact 440 and armature 450 of a switch actuated by the depth and pendulum unit 24 and either the normally engaging contact 460 and armature 470 of the enabler relay 25 or the contact 71 and armature 72 of the gate relay 290 and the contact 500 and armature 470 of the enabler relay.

Before the enabler relay operates, the energizing circuit for the control relay 410 is arranged to be closed to ground over the contact 460 and armature 470 and is opened or closed in accordance with the actuation of the armature 450 by the depth and pendulum unit 24, whereby the elevator is deflected to maintain the torpedo level at a preassigned depth. When the enabler relay 25 operates and the gate 290 has not released, the energizing circuit for the relay 410 is arranged to be closed to ground over the contact 500 and armature 470 of relay 25 and contact 71 and armature 72 of relay 290, and the elevator remains under control of the depth and pendulum unit.

When the gate 290 which is normally operated, releases, the armature 72 is moved out of engagement with the contact 71 into engagement with the contact 73 whereby the elevator is transferred to signal control in accordance with the operation of the relay 230, the energizing circuit for the relay 410 in this case being traced from ground, through source 39 and relay 410, over contact 510 and armature 520 of relay 230, contact 73 and armature 72 of the gate 290 and thence to ground over contact 500 and armature 470 of the enabler relay 25. It will be appreciated that the elevator 100 remains under signal control only so long as the signal level at the hydrophones 150 is sufficiently high to effect release of the gate 290. If the gate 290 reoperates, the elevator is returned to control by the depth and pendulum unit 24.

Details of an illustrative form of the floor and ceiling switch controls are shown in FIG. 3. Each of the hydrophones 150 is connected to the input circuit of a respective electron discharge device 74, each of these circuits including an inductance 75 and condenser 76 bridged across the associated hydrophone 150 and a portion of the potentiometer resistance 77, the latter being adjusted to balance the two circuits. The secondary winding of a transformer 78 is connected across the condensers 76, the midpoint of this winding being connected to ground by way of a source 79, such as a battery, and the primary winding of the transformer being energized by an alternating current source 80, such as an electronic oscillator. The voltage of the source 79 is such as to bias the devices 74 beyond cut-off and the source 80 is of such capacity that the voltage impressed thereby upon the input circuits of the devices 74 is sufficient to overcome the blocking bias due to the source 79 whereby the devices 74 are rendered conductive in alternation and the two hydrophones are connected in alternation to the input of the amplifier 170. The source 80 also controls the switches 20 and 200 and the input circuit for the rudder signal control system, which is similar to that for the elevator control system illustrated. Further details of the switch control and input circuits are described fully in the application of Donald D. Robertson identified hereinabove.

As shown in FIG. 3, the screen grids of the devices 74 are connected to ground by way of a blocking condenser 81.

The floor switch 32 comprises a bellows 82, the interior of which is in communication with the sea by way of a pipe 83 leading to a port in the torpedo body, an armature 84 and a pair of contacts 85. The armature 84 is connected to a point of moderately high negative voltage, for example, an intermediate point on the source 39. Normally, the armature 84 is disengaged from the contacts 85. However, if the torpedo sinks to below a preassigned depth, the bellows 82 expands so that the armature 84 is moved into engagement with the contacts 85 and a negative voltage sufficient to block the devices 74 in both the rudder and elevator control systems, is applied to the screen grids of these devices over the normally engaging contacts 86 and armature 87 of a relay 88.

The relay 88 is included in the plate circuit of a normally conducting electron discharge device 89, the input circuit for which device includes a condenser 90 and resistor 91 as shown. One common terminal of the resistor 91 and condenser 90 is connected to ground as shown and the other terminal is connected to the armature 92 of the ceiling switch 34. This armature is actuated by a bellows 93, the interior of which is in communication with the sea by way of a pipe 94 leading to a port in the body of the torpedo. When the torpedo is below a preassigned depth, the bellows 93 is expanded to hold the armature 92 out of engagement with its associated contact 95 which is connected to a point of negative potential, for example, an intermediate point on the source 39.

If the torpedo rises above the preassigned ceiling, the bellows 93 contracts so that the armature 92 engages the contact 95. Consequently, a negative charge is placed upon the condenser 90 sufficient to bias the grid of the device 89 beyond cut-off so that this device is rendered non-conducting. As a result, the relay 88 releases and a blocking bias is impressed upon the screen grids of the devices 74 in the elevator control system over the contact 96 and armature 87 of the relay 88. When the devices 74 in the elevator system are thus rendered non-conducting, the gate relay 290 reoperates so that the elevator is transferred to control by the depth and pendulum unit 24, whereupon the torpedo sinks and tends to return to its normal running depth. As the torpedo sinks, it passes below the level for which the ceiling switch 34 is set and, hence, the bellows 93 expands to disengage the armature 92 from the contact 95 whereby the source is disconnected from the input circuit for the device 89. Thereupon the condenser 90 discharges through the resistor 91 and after a time determined by the constants of this condenser and resistor, the potential upon the grid of the device 89 falls below the blocking value and this device becomes conductive, whereupon the relay 88 operates, the blocking bias on the devices 74 is removed, and the elevator is returned to signal control. As has been pointed out heretofore, the duration of the period for which the signal control of the elevator is disabled may be set at various times with consideration for particular conditions and torpedo characteristics. Practically, the desired time is set by correlation of the parameters of the condenser 90 and resistor 91.

Details of a typical auxiliary pendulum control are illustrated in FIG. 4. As shown in this figure, the amplifier 220 may comprise a pair of similar electron discharge devices 301 connected in push-pull relation, the input circuit including resistors 302 and condensers 303, each of which is charged in accordance with the output of the respective rectifier 190 and the two condensers being arranged to be charged in opposite directions, whereby the potential across the two in series is proportional to the difference between the outputs of the two hydrophones 150. The amplifier input circuit includes also a pair of potentiometer resistors 304 and 305 energized from a battery 306, the resistor 304 serving, when adjusted, to establish initial balance between the two devices 301. The resistor 305 is actuated by a pendulum 307 to produce a bias proportional to the angle of torpedo tilt and of the polarity to oppose the target difference signal appearing across the condensers 303. Stops 308 are provided to limit the motion of the pendulum and, hence, the bias that can be produced thereby.

Although a specific embodiment of the invention has been shown and described, it will be understood that it is but illustrative and that various modifications may be made therein without departing from the scope and spirit of this invention, as defined in the appended claims.

What is claimed is:

1. A steering system for a moving body, comprising a rudder, actuating means for said rudder, control means normally associated with said actuating means for maintaining the body on a preset course, signal responsive means for controlling said actuating means and normally dissociated therefrom, transfer means for associating said signal responsive means with said actuating means and dissociating said control means therefrom, gate means energized in accordance with the level of signals received by said signal responsive means for effecting operation of said transfer means when said level is of at least a prescribed amplitude, and means for locking said transfer means in operated condition when said level is of at least said prescribed amplitude for a preassigned period.

2. A steering system for a moving body, comprising a rudder, actuating means for said rudder, control means normally associated with said actuating means for maintaining the body on a preset course, signal responsive means for controlling said actuating means and normally dissociated therefrom, transfer means for associating said signal responsive means with said actuating means and dissociating said control means therefrom, gate means energized in accordance with the level of signals received by said signal responsive means for effecting operation of said transfer means when said level is of at least a prescribed amplitude, and means responsive to operation of said transfer means continuously for a preassigned period for locking said transfer means in operated position.

3. A steering system for a torpedo, comprising a rudder, actuating means for said rudder, gyroscope means for controlling said actuating means and normally associated therewith to maintain the torpedo on a preset course, control means responsive to submarine signals for controlling said actuating means in accordance with the direction of the source of such signals with respect to the torpedo to steer the torpedo toward said source, said control means being normally dissociated from said actuating means, transfer means for associating said control means with said actuating means and dissociating said gyroscope means therefrom when the signals received by said control means are of at least a preassigned amplitude, lock-up means for said transfer means, and means for operating said lock-up means only when said level of said signals remains of at least said preassigned amplitude for a prescribed period.

4. A steering system for a torpedo, comprising a rudder, actuating means for said rudder, gyroscope means for controlling said actuating means and normally associated therewith to maintain the torpedo on a preset course, control means responsive to submarine signals for controlling said actuating means in accordance with the direction of the source of such signals with respect to the torpedo to steer the torpedo toward said source, said control means being normally dissociated from said actuating means, transfer relay means for associating said control means with said actuating means and dissociating said gyroscope means therefrom, gate means for operating said transfer relay means whenever the level of said signals is of at least a preassigned amplitude, a lock-in circuit for said transfer relay means, and means controlled by said transfer relay means for closing said lock-in circuit when said transfer relay means remains operated continuously for a prescribed period.

5. A control circuit comprising an operating means, actuating means for said operating means, a first control means for said actuating means and normally associated therewith, a second control means for said actuating means and normally dissociated therefrom, said second control means comprising a signal responsive circuit, transfer means controlled in accordance with the level of signals received by said circuit for associating said second control means with said actuating means and dissociating said first control means therefrom when said level is of at least a preassigned amplitude, and means for locking said transfer means in operated condition when said level remains of at least said amplitude for a prescribed time.

6. A steering system for a torpedo, comprising a rudder, an elevator, individual submarine signal responsive control means for said rudder and elevator for steering the torpedo toward a target in accordance with submarine signals emanating from the target, and means for disabling the control means for said elevator for a period of preassigned duration whenever the torpedo rises above a prescribed depth.

7. A steering system for a torpedo, comprising a rudder, means for controlling said rudder in accordance with signals emanating from a target to guide the torpedo horizontally toward the target, an elevator, a first means normally associated with said elevator for maintaining the torpedo at a preassigned depth, a second means for controlling said elevator in accordance with said signals to guide the torpedo vertically toward the target, said second means being normally dissociated from said elevator, transfer means for associating said second means with said elevator and dissociating said first means therefrom, gate means for operating said transfer means when the level of said signals received by said second means is of at least a preassigned amplitude, and means for disabling said gate means for a period of preassigned duration whenever the torpedo rises above a prescribed depth.

8. A steering system for a torpedo, comprising a rudder, means for controlling said rudder in accordance with signals emanating from a target to steer the torpedo horizontally toward the target, an elevator, depth control means for controlling said elevator to maintain the torpedo at a preassigned running depth, a signal responsive circuit for controlling said elevator in accordance with said signals to steer the torpedo vertically toward the target, transfer means for selectively associating either said depth control means or said circuit with said elevator, gate means for operating said transfer means whenever the signal level in said circuit is of at least a preassigned amplitude to associate said circuit with said rudder, said transfer means being constructed and arranged so that when not operated by said gate means it associates said depth control means with said elevator, and means for disabling said circuit for a prescribed time when the torpedo rises above a preassigned depth.

9. A steering system for a torpedo, comprising normally disabled signal responsive means for steering the torpedo horizontally toward a target in accordance with signals emanating from the target, means for permanently enabling said signal responsive means when said torpedo comes within a preassigned range of said target, a second signal responsive means for steering the torpedo vertically toward the target, means for disabling said signal responsive means for a period of preassigned duration whenever said torpedo in the course of a run rises above a preassigned depth, and means for steering said torpedo downwardly toward a second preassigned depth when said second signal responsive means is disabled.

10. A steering system for a torpedo, comprising a rudder, normally disabled submarine signal responsive means for controlling said rudder in accordance with signals emanating from a target to steer the torpedo horizontally thereto, means for permanently enabling said signal responsive means when said torpedo comes within a preassigned range of said target, an elevator, a second submarine signal responsive means for controlling said elevator to steer said torpedo vertically and including a pair of hydrophones mounted above and below the longitudinal axis of said torpedo and including also circuit means for resolving the outputs of said hydrophones into a difference signal in accordance with the polarity of which said elevator is deflected, and means for disabling said circuit means for a period of preassigned duration when said torpedo rises above a prescribed depth.

11. A steering system for a moving body, comprising a steering member, a pair of signal translating devices, means for resolving the outputs of said devices into a difference signal related in polarity and amplitude to the bearing of the source of signals received by said devices with respect to the body, means for actuating said steering member in accordance with said difference signal to steer the body toward said source, and means for reducing said difference signal proportionately to the angle of turn of said body throughout a limited range of turn angles.

12. A steering system for a moving body, comprising a steering member, means for actuating said member, a signal controlled device for controlling said actuating means in accordance with the polarity of the signal supplied to said device, signal responsive means for supplying to said device a steering signal related in polarity and amplitude to the direction with respect to the body of the source of signals received by said signal responsive means, and means for supplying to said device a biasing signal in opposition to said steering signal and proportional to the angle of turn of said body throughout a limited range of turn angles.

13. A steering system for a torpedo, comprising an elevator, means for deflecting said elevator to steer the torpedo vertically, means responsive to signals emanating from a target for controlling said deflecting means, and means actuated in accordance with the tilt of the torpedo for limiting the amplitude of deflection of said elevator to less than a preassigned value when the vertical angle between the target and torpedo is of less than a prescribed magnitude.

14. A steering system for a torpedo, comprising an elevator, a pair of signal translating devices responsive to submarine signals, means for resolving the outputs of said devices into a difference signal related in amplitude and polarity to the angle with respect to the torpedo, of the source of signals received by said devices, means for actuating said elevator in accordance with said difference signal to steer the torpedo vertically toward said source, and means for reducing said difference signal proportionally to the angle of tilt of said torpedo when said difference signal is of less than a preassigned amplitude.

15. A steering system for a torpedo, comprising an elevator, a direct current amplifier having an input circuit, means controlled by said amplifier for deflecting said elevator in one direction or the other in accordance with the polarity of the potential across a portion of said input circuit, a pair of hydrophones, means for resolving the outputs of said hydrophones into a difference potential impressed upon said circuit and related in amplitude and polarity to the angle between the torpedo and the source of the signals received by said hydrophones, auxiliary means actuated in accordance with the angle of tilt of said torpedo for impressing upon said circuit a second potential in opposition to said difference potential and proportional to said angle, and means for limiting operation of said auxiliary means to a restricted range of tilt angles.

16. A steering system in accordance with claim 15 wherein said auxiliary means comprises a potentiometer in said circuit and a pendulum responsive to tilt of said torpedo for actuating said potentiometer.

No references cited.